(No Model.)
J. M. WALLIS.
CLEANING STRAINERS OF LOCOMOTIVE FEED PIPES.
No. 387,668.  Patented Aug. 14, 1888.
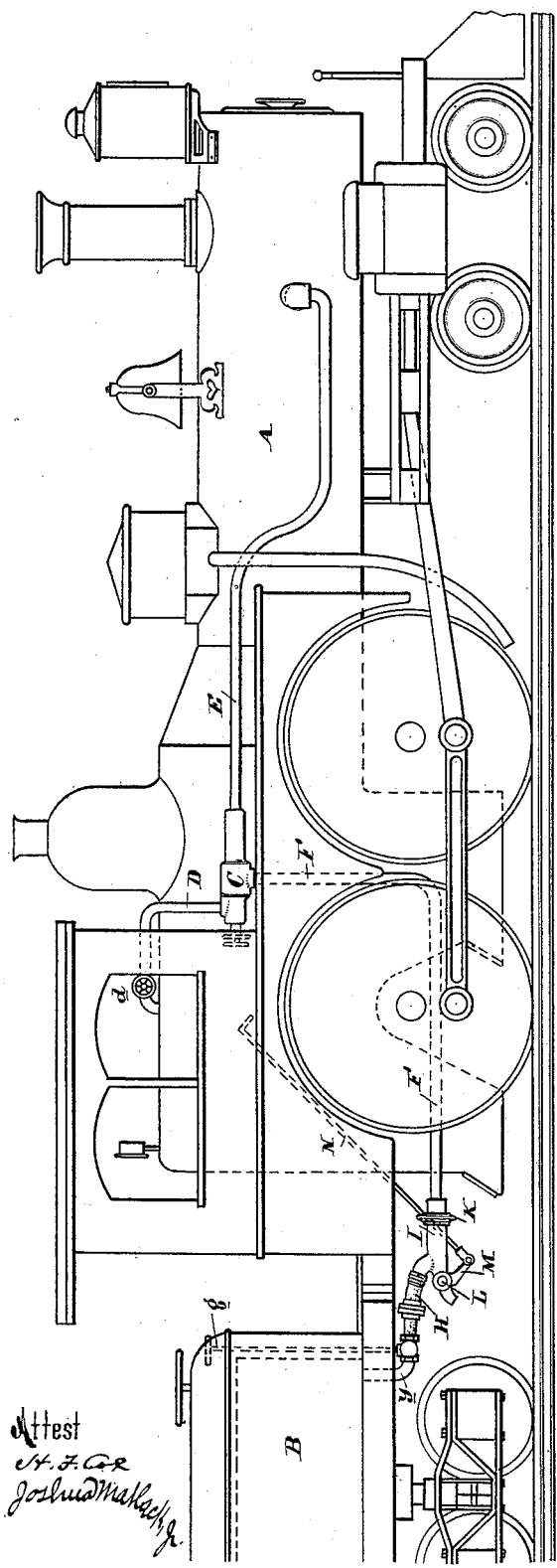
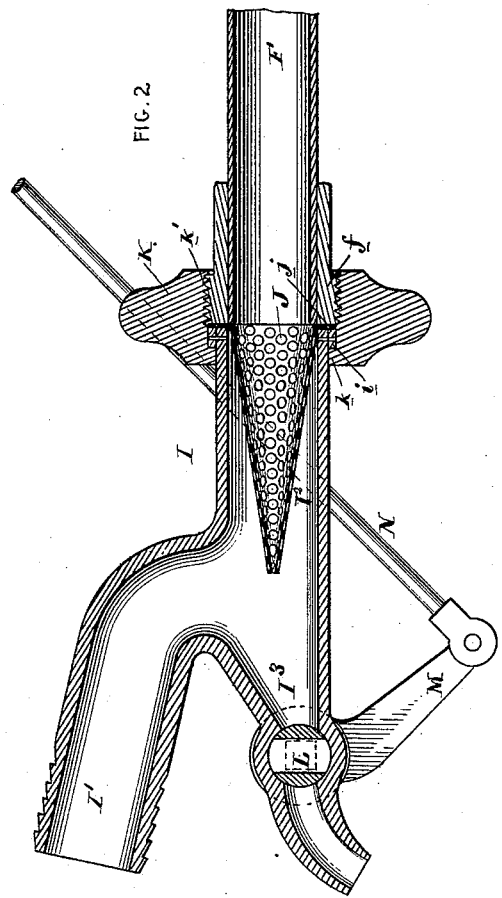
Attest
N. F. Cox
Joshua Walker Jr.
Inventor,
John M. Wallis.
by his attorney
Francis T. Chambers

UNITED STATES PATENT OFFICE.

JOHN M. WALLIS, OF NEAR QUEENSTOWN, MARYLAND.

CLEANING STRAINERS OF LOCOMOTIVE FEED-PIPES.

SPECIFICATION forming part of Letters Patent No. 387,668, dated August 14, 1888.

Application filed December 10, 1887. Serial No. 257,486. (No model.)

*To all whom it may concern:*

Be it known that I, JOHN M. WALLIS, living near Queenstown, Queen Anne county, State of Maryland, have invented a new and useful Improved Apparatus for Cleaning Strainers on Locomotive Feed-Pipes, of which the following is a true and exact description, reference being had to the accompanying drawings, which form a part of this specification.

My invention relates to devices whereby the strainers which are used in the feed-water pipes of injectors on locomotive-engines can be cleared of the leaves, &c., which enter the pipe from the tender and are stopped by the strainers.

My object is to simplify and improve the construction and mode of operation of these cleaning devices; and my invention consists of the devices and combinations of devices hereinafter described, and which are illustrated in the drawings, in which—

Figure 1 is a side view of a locomotive and of the front end of its tender, showing my device connected for use; and Fig. 2 is a sectional view of my improved strainer and cleaning device.

A is the locomotive; B, the tender; C, an injector for feeding the boiler; D, a steam-pipe leading from the boiler to the injector; $d$, a valve in said pipe.

E is the pipe leading from the injector to the boiler.

F is the feed-water pipe leading to the injector.

$y$ is a pipe leading out from the tank in tender B; $g$, a valve for opening and closing said pipe.

H is the coupling-hose, whereby the pipe $y$ is united with the strainer-box I, and through it with pipe F, so that the injector can draw its water-supply from the tank on the tender.

I is the strainer-box, which is secured on the end of pipe F and forms a part of the conduit from the tender-tank to the injector.

J is the strainer, which is preferably made of conical form, as shown, because it is less likely to be entirely stopped by dirt than if made in the shape of a perforated disk.

As shown in the drawings, I provide the larger end of the conical strainer with a flat annular disk, which fits between the end of pipe F and the end of arm $I^2$ of the strainer-chamber I. The end of pipe F is threaded and the end of the arm $I^2$ provided with an annular rim, $i$, secured in place by brazing, rivets, or any convenient fastening.

K is a swivel-nut with an inwardly-projecting annular flange, $k$, on one edge, said flange fitting over the arm $I^2$ of the box I, and its other end, $k'$, threaded to engage with the threaded end $f$ of pipe F. The nut K is first slipped over the arm $I^2$ of strainer-box I, and the rim $i$ then secured on the end of the arm, as shown. The conical strainer J is then inserted in the arm $I^2$, with its rim $j$ resting on the end thereof, and the nut K then screwed up on the end $f$ of pipe F, clamping the strainer between the ends $i$ and $f$, as shown. Instead of placing the strainer so that its point will extend into the box I, as shown, it may be turned to extend into pipe F, though I prefer and recommend the plan shown.

Besides the arm $I^2$, which registers with the end of pipe F, the strainer-box I has an arm, $I'$, to which one part of the coupling-hose H is attached, and an opening, $I^3$, leading to the open air, and preferably arranged to be substantially opposite the end $I^2$, in which the strainer J is secured. This passage $I^3$, which I prefer to make of the tubular form shown, is opened or closed by the movement of a cock-valve, L, which is actuated from the cab of the locomotive by means of a rod, N, the lower end of which is attached to a lever, M, secured on cock L.

The operation of my device is as follows: The pipe $y$ and strainer-box I being coupled by means of the hose H and the valve $g$ open the water from the tender B can pass freely through the conduit, consisting of $y$, H, I, and F, to the injector C when the said injector is in operation to feed the boiler. All leaves and similar obstructive substances in the water are caught and retained by the strainer J, which of course becomes more or less clogged, or, perhaps, entirely stopped, by their accumulation. Whenever this occurs, or, preferably, with sufficient frequency to prevent its occurrence, the engineer should open the passage $I^3$ by turning the plug L through rod N, open steam-passage D, and pull back the injector, allowing steam to pass through injector C into pipe F, whence it will pass through strainer J and escape through passage I³, carrying with it all substances which have been caught on the sides of the strainer or accumulated near it, for of course the steam issuing through the passage I³ will act to draw the water out of arm I' in the manner of an ejector. It is important that the passage from the strainer to the exit opening or passage I³ should be direct, as the escape of the accumulated dirt is insured by this construction. This device for blowing the water out of the injector feed-pipe is also useful where difficulty is found in starting the injector because of hot water, and situated, as it is, at the lowest point in the feed-water pipe it can be conveniently used to drain said pipe and the supply-pipe from the tender of water where there is danger of freezing.

As shown and above described, the apparatus is constructed and adapted for use in what I believe to be the best and most perfect way; but it can of course be modified in shape and arrangement without departure from my invention. Thus, it is not essential that the strainer be of conical form, and the position of the arms I' I² and the passage I³ of the strainer-box may be varied. It is also self-evident that the "strainer-box," as I have called it, constitutes in fact but a part of the injector feed-pipe.

I am aware that feed-water screens have heretofore been made in which the screen was from time to time cleaned by blowing steam through it by means of a separate steam-pipe. Without going into minor points of difference, all such pre-existing devices are to be distinguished from my invention by the absence of any independent steam-pipe in my device, wherein the feed-pipe itself serves to conduct the steam back to and through the screen when the cock at the exit-orifice is opened. The steam-current, being thus in direct reversal of the water-current, operates most efficiently in clearing the holes of the strainer, and the whole apparatus is greatly simplified.

Having now described my invention, what I claim as new, and desire to secure by Letters Patent, is—

1. In a device for cleaning the strainers of locomotive feed-pipes, substantially as specified, the combination, with the injector feed-pipe, of a screen arranged within and forming a partition across a substantially straight portion of said feed-pipe, with its axis in line therewith, an orifice controlled by a cock situated on the inlet side of the screen, and mechanism for actuating said cock from the locomotive-cab, all substantially as shown and described.

2. In a device for cleaning the strainers of locomotive feed-pipes, substantially as specified, the combination, with the injector feed-pipe, of a conical screen arranged within and forming a partition across a substantially straight portion of said feed-pipe, with its axis in line therewith, an orifice controlled by a cock and situated on the inlet side of the screen, and mechanism for actuating said cock from the locomotive-cab, all substantially as shown and described.

3. In a device for cleaning the strainers of locomotive feed-pipes, substantially as specified, the combination, with the injector feed-pipe, of a screen arranged within and forming a partition across a substantially straight portion of said feed-pipe, with its axis in line therewith, an orifice controlled by a cock situated on the inlet side of the screen and substantially in line with the straight portion of the feed-pipe containing the screen, and mechanism for actuating said cock from the locomotive-cab, all substantially as shown and described.

4. In a device for cleaning the strainers of locomotive feed-pipes, substantially as specified, the combination, with the injector feed-pipe, of a screen-box arranged at the bottom of said pipe and having a water-inlet opening in an arm extending from its top, a water-exit opening in another arm adapted to be attached to the feed-pipe, and a tubular orifice placed opposite to said exhaust-opening and at the bottom of the box, a cock situated in said tubular orifice, whereby it can be opened or closed at will, mechanism for actuating said cock from the cab of the engine, and a screen situated at the end of the exhaust-opening, with its axis substantially in line with the said opening, all substantially as and for the purpose specified.

JOHN M. WALLIS.

Witnesses:
FRANK A. MULLIKIN,
H. F. COX.